Patented Aug. 8, 1933

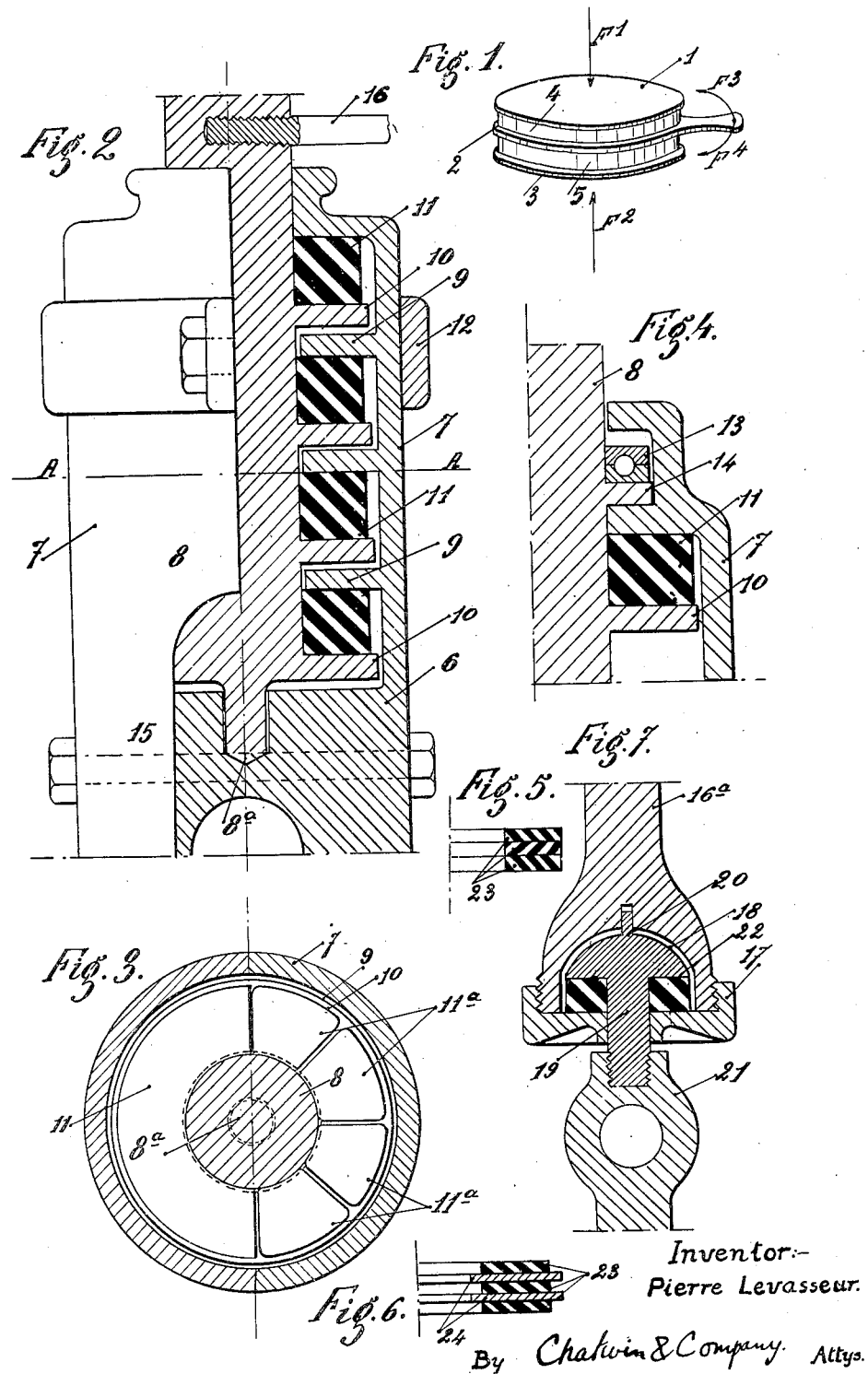

1,921,931

UNITED STATES PATENT OFFICE 1,921,931

SCREW PROPELLER

Pierre Levasseur, Paris, France

Application January 20, 1931, Serial No. 509,954, and in France January 23, 1930

7 Claims. (Cl. 170—162)

The invention relates to screw propellers with variable pitch.

It is known that a modification of a few degrees in the incidence of the blades of propellers is capable of increasing to a notable extent the efficiency of the latter during operation. For this purpose there have been constructed propellers with pivotal blades known as "variable pitch" but the control of the pivotal movement of the blades has met with an almost insurmountable obstacle in the effects of the centrifugal force on said blades the pivots of which receive stress of several tons which causes considerable friction opposing the pivotal movement sought no matter how weak it is.

The present invention has for object improvements in variable pitch propellers its object being to overcome the above objections by eliminating the detrimental friction due to centrifugal force on the pivots of the blades.

These improvements consist in principle in substituting for the mechanical friction the molecular work of an appropriate material and for this purpose to interpose between the corresponding bearings of the propeller hub under consideration and the pivot of the blade, a plastic material which is sufficiently resilient to permit by torsion and without friction, slight relatively angular displacements between the bearings of the pivot of the blade and the corresponding bearings of the propeller hub.

The invention comprises in addition a certain number of constructional forms and characteristic arrangements the whole of which will be described hereafter with reference to the accompanying drawing in which:

Figure 1 is a representative view showing the principle of the invention; Fig. 2 is an elevation, partly in section of the pivot of a propeller blade in conformity with the present invention; Fig. 3 is a section of this pivot taken on the line A—A of Fig. 2; Figs. 4, 5 and 6 show modified constructions; Fig. 7 refers to a further modification.

As will be seen in the drawing by reference to Fig. 1, if three metallic surfaces 1, 2, 3, are considered capable of coming in contact, and which applied suitably to the system of forces $F^1$, $F^2$ equal to several tons, it will be seen that by reason of the friction it is almost impossible to displace the element 2 in relation to the elements 1 and 3, even if ball bearings are interposed, this displacement also causes appreciable friction and requires considerable effort directly proportional to the forces $F^1$, $F^2$.

On the other hand, if between the elements 1, 2 and 2, 3 there are interposed elements 4, 5 made from plastic or resilient material, or plastic and resilient material, it will be seen that the crushing effect resulting from the forces $F^1$, $F^2$ does not exceed a certain limit of rate of work of the material considered, it is easy to give to the element 2 angular displacements for example of an amplitude proportional to the resiliency of the elements 4, 5. For slight displacements, three of four degrees for instance, the power to distribute is almost nil and practically independent of the forces $F^1$, $F^2$ normally causing the displacements represented by $F^3$, $F^4$, this results from the absence of mechanical friction replaced by the molecular work of the material of elements 4, 5.

The present invention is based on the principle defined above and consists as seen in Fig. 2 in connecting the pivot of the blades considered and the hub of the propeller through the intermediary of plastic elements.

For this purpose, such an arrangement essentially comprises a propeller hub 6 provided with cylindrical shells 7, in one or several parts adapted to receive and hold the blade pivots 8, corresponding thereto. Each of the elements 7 is internally provided with annular bearings 9 on which rest the corresponding bearings 10 which are integral with the pivot 8 of the blade considered.

The space separating two neighbouring bearings within the shell 7 is such that it allows of the interposition between these bearings and the corresponding ones 10 of the pivot 8 an annular lining 11 of determined thickness or several rings 23 superposed to form this thickness with or without steel washers 24 interposed between such rings (Fig. 6) made by means of a plastic and resilient material which is sufficiently strong such as caoutchouc for example.

The number of bearings 9 and 10 is established in direct relation to the traction efforts exerted on the pivot 8 and in inverse ratio to the surface of the linings 11, the height of which is determined in terms of the efforts exerted per square centimetre and of the angular displacement which is maximum and susceptible of being obtained between the shells 7 and the pivot 8.

The linings 11 as stated above can be made of continuous annular elements or divided in sectors 11ᵃ (Fig. 3) or in any other manner.

In the case where the shell 7 is made in two parts, after insertion of the pivot 8 by these two parts there is need to keep the whole assembled by means of collars 12 or in any other manner.

Moreover, the base of the pivot 8 comprises a centering pin 8a entering a housing 15 formed for this purpose in the hub 6. The operation of this apparatus is the following:

The bearings 9 and 10 which correspond together on the pivot 8 and in the shell 7 being separated by a pre-determined thickness of plastic and resilient material, when an effort is exerted on the lever 16 to give an angular displacement of the pivot 8 relatively to the shell 7. The surfaces in contact receive no relative displacement but the lining fibres 11 incline and spread or lengthen thus permitting the rotation of the pivot 8 within the elastic limit of the material used, which is very considerable for instance in the case of rubber or caoutchouc over the deformation produced by a rotation of the pivot 8 equal to two or three degrees, useful in the case of propellers with pivotal blades. As soon as the effort exerted on the lever 16 is finished or changes direction the elastic fibres re-assume their original position or incline in opposite direction while the pivot 8 receives a displacement at an opposite angle to the preceding displacement, relatively to the shell 7. As long as the axial pressure on the elastic or plastic material does not exceed the elastic limit thereof, the efforts to be exerted for an angular displacement of the pivot 8, are practically very slight by reason of the substitution of molecular work of a plastic and resilient material without any friction, to the mechanical friction which are enormous resulting from the action of the centrifugal force on the pivotal systems actually used for propellers with variable pitch.

In a modification shown in Fig. 4 a ball stop 13 is provided between the first bearing 14 of the pivot 8 and the upper part of the shell 7 to limit exactly the axial displacement of this pivot in said shell. In this case, the various elements of the arrangement are calculated so that the stop 13 absorbs but a small part of the efforts exerted on the pivot 8.

In another modification shown in Fig. 7, each propeller blade 16a comprises a screw threaded hood 17, screwed at its base and obturating a cavity 18 formed in same and serving to lodge the head 20 of a pivot 19 in form of a mushroom connecting the blade 16a to the hub 21 through the intermediary of an elastic washer 22 of sufficient thickness and interposed between the head 20 and the screw threaded hood 17 with the object of permitting, as before, a rotation of the foot of the blade 16a relatively to the pivot 19 without friction of the contacting surfaces.

The operation of this arrangement is analogous to that of the arrangements shown in Figures 2, 3 and 4.

The invention comprises the application for the purpose previously developed of all plastic or resilient materials no matter of what degree, with the precautions or necessities required for each of these.

The arrangements hereabove are naturally only given by way of example, the shapes, materials and dimensions of the constitutive parts as well as the disposition of detail, can be modified without affecting the scope of the invention.

I claim:

1. In a variable pitch propeller, a hub having bearing members, blades having bearing members mounted on said hub, a plurality of thin rings, said rings being formed of plastic or resilient material, said rings being inserted between the bearing members of the hub and the bearing members of the blades, said rings being separated by said bearing members.

2. In a variable pitch propeller as claimed in claim 1 including metal discs disposed between the resilient rings and the bearing members.

3. In a variable pitch propeller as claimed in claim 1 including a plurality of resilient ring members said resilient ring members being formed in segments.

4. A variable pitch propeller having a plurality of pivotal blades comprising a cavity in the base of the propeller blade, an external screw thread upon said blade, a hood member, an internally threaded cavity in said hood member, said blade screwing into said cavity, a resilient ring housed in said cavity, a head housed in the propeller cavity, a pivot carried by said head, a hub, said pivot being mounted in said hub, the resilient ring being disposed between said head and said hood member.

5. In a variable pitch propeller, including a head member, a hood member and a plurality of thin superposed resilient rings, said rings being disposed between the head member and the hood member.

6. In a variable pitch propeller including a head member, a hood member, and a plurality of thin superposed resilient rings, said rings being disposed between the head member and the hood member, said rings being constructed in segments.

7. In a variable pitch propeller including a head member, a hood member, a plurality of thin superposed resilient rings, said rings being disposed between the head member and hood members and metal discs superposed upon said resilient rings.

P. LEVASSEUR.